United States Patent
Srivastava et al.

(10) Patent No.: US 12,476,979 B2
(45) Date of Patent: Nov. 18, 2025

(54) AGENTICALLY-ORCHESTRATED FOUNDATIONAL MODELS FOR CLOUD SECURITY CONTROLS

(71) Applicant: Google LLC, Mountain View, CA (US)

(72) Inventors: Aayush Srivastava, New York, NY (US); Alison Marlene Andrews, Stonington, CT (US); Sai Rama Raju Bhupathiraju, Cedar Park, TX (US)

(73) Assignee: GOOGLE LLC, Mountain View, CA (US)

( * ) Notice: Subject to any disclaimer, the term of this patent is extended or adjusted under 35 U.S.C. 154(b) by 78 days.

(21) Appl. No.: 18/651,887

(22) Filed: May 1, 2024

(65) Prior Publication Data

US 2025/0343799 A1    Nov. 6, 2025

(51) Int. Cl.
    *H04L 9/40* (2022.01)
(52) U.S. Cl.
    CPC .................. *H04L 63/105* (2013.01)
(58) Field of Classification Search
    CPC .................. H04L 63/00; H04L 63/20
    See application file for complete search history.

(56) References Cited

U.S. PATENT DOCUMENTS

| | | | |
|---|---|---|---|
| 2017/0357812 A1* | 12/2017 | Lerner | G06N 20/00 |
| 2020/0351296 A1* | 11/2020 | Francoeur | H04L 63/1433 |
| 2022/0353296 A1* | 11/2022 | Louie | G06N 20/00 |
| 2023/0208871 A1* | 6/2023 | Yellapragada | G06N 3/045 |
| | | | 726/25 |
| 2024/0080343 A1* | 3/2024 | Wenzel | H04L 63/20 |
| 2024/0259415 A1* | 8/2024 | Bansal | H04L 63/20 |
| 2025/0139250 A1* | 5/2025 | Manjunath | G06F 21/577 |
| 2025/0265338 A1* | 8/2025 | Albero | G06F 8/77 |

* cited by examiner

*Primary Examiner* — Joshua Joo
(74) *Attorney, Agent, or Firm* — DORITY & MANNING, P.A.

(57) ABSTRACT

Cloud architecture information descriptive of a proposed cloud architecture is obtained, including user response information including information indicative of cloud architecture requirements for the proposed cloud architecture to fulfill and component selection information indicative of cloud components that meet cloud architecture requirements. The cloud architecture information is processed with agentic orchestration models to obtain a role output including security control information indicative of security controls selected for the proposed cloud architecture. Each of the agentic orchestration models includes a machine-learned model prompted to fulfill a corresponding cloud architecting role. The role output is associated with a cloud security role. Based on the security control information, information indicative of the security controls selected for the proposed cloud architecture is provided to a user device.

20 Claims, 8 Drawing Sheets

AGENTICALLY-ORCHESTRATED FOUNDATIONAL MODELS FOR CLOUD SECURITY CONTROLS

FIELD

The present disclosure relates generally to model-based selection of cloud security controls for cloud-based architectures. More specifically, the present disclosure relates to utilizing foundational models representing particular agent roles (e.g., developers, designers, etc.) to select security controls for a proposed cloud architecture.

BACKGROUND

Cloud computing generally refers to large, distributed networks of computing resources (e.g., Central Processing Units (CPUs), memory, storage, etc.) used to deliver computing services (e.g., servers, storage, databases, networking, software, etc.) over the internet. Cloud computing systems enable users to access resources and applications from anywhere with an internet connection, without the need for physical infrastructure or on-premises hardware. Cloud computing systems are conventionally implemented in partnership with cloud computing platforms. Generally, a cloud computing platform will own a distributed network of computing resources that can be leveraged by users to implement cloud systems that the user develops. In addition, many cloud computing systems leverage virtualization technology, such as containers or virtual machines, to more efficiently allocate computing resources to users. For example, rather than assigning a CPU core exclusively to a user, a cloud platform may instantiate multiple virtual machines to implement cloud computing systems for multiple users, and the virtual machine can utilize the CPU core on an as-needed basis.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method. The method includes obtaining, by a computing system comprising one or more computing devices, cloud architecture information descriptive of a proposed cloud architecture, comprising user response information comprising information indicative of cloud architecture requirements for the proposed cloud architecture to fulfill, and component selection information indicative of a plurality of cloud components that meet cloud architecture requirements for the proposed cloud architecture. The method includes processing, by the computing system, the cloud architecture information with a plurality of agentic orchestration models to obtain a role output comprising security control information indicative of a plurality of security controls selected for the proposed cloud architecture, wherein each of the plurality of agentic orchestration models comprises a machine-learned model prompted to fulfill a corresponding cloud architecting role of a plurality of cloud architecting roles, and wherein the role output is associated with a cloud security role of the plurality of cloud architecting roles. The method includes, based on the security control information, providing, by the computing system, information indicative of the plurality of security controls selected for the proposed cloud architecture to a user device associated with the user response information.

Another example aspect of the present disclosure is directed to a computing system. The computing system includes one or more processor devices and one or more tangible, non-transitory computer readable media storing computer-readable instructions that when executed by the one or more processor devices cause the computing system to perform operations. The operations include obtaining cloud architecture information descriptive of a proposed cloud architecture, comprising user response information comprising information indicative of cloud architecture requirements for the proposed cloud architecture to fulfill and component selection information indicative of a plurality of cloud components that meet cloud architecture requirements for the proposed cloud architecture. The operations include processing the cloud architecture information with a plurality of agentic orchestration models to obtain a role output comprising security control information indicative of a plurality of security controls selected for the proposed cloud architecture, wherein each of the plurality of agentic orchestration models comprises a machine-learned model prompted to fulfill a corresponding cloud architecting role of a plurality of cloud architecting roles, and wherein the role output is associated with a cloud security role of the plurality of cloud architecting roles. The operations include, based on the security control information, generating control configuration information indicative of the plurality of security controls.

Another example aspect of the present disclosure is directed to one or more tangible, non-transitory computer readable media storing computer-readable instructions that when executed by one or more processor devices cause the one or more processor devices to perform operations. The operations include obtaining cloud architecture information descriptive of a proposed cloud architecture, comprising user response information comprising information indicative of cloud architecture requirements for the proposed cloud architecture to fulfill, and component selection information indicative of a plurality of cloud components selected that meet cloud architecture requirements for the proposed cloud architecture. The operations include processing the cloud architecture information with a plurality of agentic orchestration models to obtain a role output comprising security control information indicative of a plurality of security controls selected for the proposed cloud architecture, wherein each of the plurality of agentic orchestration models comprises a machine-learned model prompted to fulfill a corresponding cloud architecting role of a plurality of cloud architecting roles, and wherein the role output is associated with a cloud security role of the plurality of cloud architecting roles. The operations include, based on the security control information, providing information indicative of the plurality of security controls selected for the proposed cloud architecture to a user device associated with the user response information.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
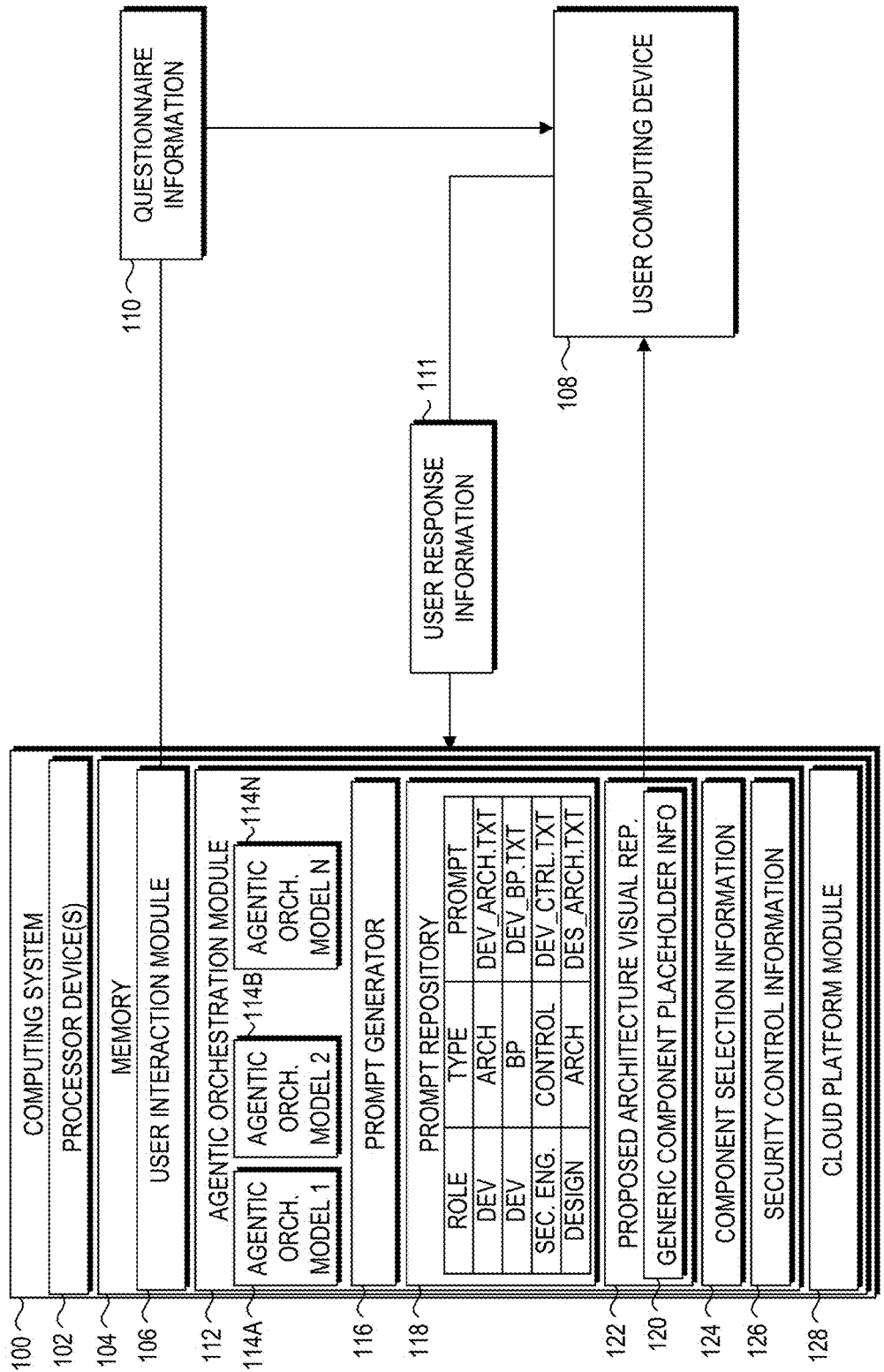
FIG. 1 depicts an overview block diagram of a computing system for agentically-orchestrated foundational models for cloud architecture development and/or security control selection according to some implementations of the present disclosure.

Reference numerals that are repeated across plural figures are intended to identify the same features in various implementations.

DETAILED DESCRIPTION

Overview

Generally, the present disclosure is directed to utilizing foundational models representing particular agent roles (e.g., developers, designers, etc.) to select security controls (e.g., security measure(s), mechanism(s), policy(s), etc.) for protecting a proposed cloud architecture. More specifically, cloud-based computing systems generally refer to distributed networks of computing resources used to deliver computing services over the internet. Cloud systems provide a number of advantages, such as enabling users to access resources and applications from anywhere with an internet connection, and more efficient allocation of computing resources via virtualization technologies. Cloud systems are conventionally implemented in partnership with cloud computing platforms. If a user wishes to create a cloud=system, the user can develop a cloud architecture for the cloud system and then partner with a cloud computing platform to implement the cloud architecture using the distributed network of computing resources owned by the cloud computing platform.

However, cloud architectures are very complex, and development of such architectures can be prohibitively difficult. In particular, developing robust cloud systems generally requires a number of subject matter experts in cloud architecture, cloud infrastructure, cloud security, networking, computer science, etc. to work in concert to develop such a system. Furthermore, even with access to such subject matter experts, development of cloud systems can be prohibitively time consuming. Finally, cloud architectures designed without the expertise provided by subject matter experts are usually substantially more vulnerable to security exploits and malicious actors. Due to these hurdles, many smaller entities lack the resources to implement robust cloud systems, and are thus unable to leverage the many advantages provided by cloud computing. As such, a technique to create cloud architectures more efficiently and effectively would provide a variety of benefits.

Accordingly, implementations described herein propose agentically-orchestrated machine-learned models to select security controls for a proposed cloud architecture. As described herein, "agentically orchestrated" models generally refer to machine-learned model instances that are prompted to conversationally perform a particular role associated with cloud architecture development (e.g., designers, architects, security engineers, etc.). Specifically, instances of agentic orchestration models can refer to instances of machine-learned models. For example, the agentic orchestration models can be or otherwise include instances of machine-learned models, such as Large Foundational Models (LFMs) (e.g., large language models, etc.), which have been trained using corpuses of training data that includes extensive information related to cloud architecture development (e.g., from subject matter experts, etc.).

As an example, a user who wishes to develop or create a cloud architecture may provide user response information (e.g., responses to a questionnaire, etc.) that indicates certain cloud architecture requirements for the cloud architecture to fulfill, such as a maximum number of connections, preferred security standards, necessary storage resources, necessary compute resources, etc. cloud components can be selected for the cloud architecture that meet the cloud architecture requirements based on the user response information. An agentic orchestration model prompted to fulfill a particular role (e.g., a security engineering role) can process the user response information alongside information describing the selected cloud components to obtain a role output that includes security control information. The security control information can indicate security controls selected for the proposed cloud architecture. As described herein, a security "control" refers to measure(s), mechanism(s), policy(s), etc. implemented to protect digital assets, information, systems, and networks from security threats and vulnerabilities. Security controls work to mitigate risks, deter potential attackers, detect security incidents, and respond effectively to security breaches. Security controls can take various forms, including technical controls such as firewalls, encryption, intrusion detection systems, and access controls, as well as procedural controls such as security policies, tiered access policies, user training, incident response plans, compliance frameworks, etc.

In some implementations, the selected cloud components can be selected using the agentic orchestration models prior to generating the security control information. The selected cloud components can be selected to fulfill generic cloud component placeholders identified using the agentic orchestration models. For example, a particular agentic orchestration model prompted to fulfill a particular role (e.g., a cloud architect role) can process the user response information described previously to generate a role output that indicates proposed generic component placeholders necessary to meet the cloud architecture requirements. The generic component placeholders can serve as generic "placeholders" for functions necessary for cloud architectures. Examples of generic component placeholders can include a "database" placeholder, a "storage" placeholder, a "firewall" placeholder, etc.

Another agentic orchestration model prompted to fulfill another role (e.g., a cloud design role) can process the user response information (alongside other role output(s) in some instances) to obtain another role output. The agentic orchestration model can be prompted to fulfill a solutions architect role, and the role output can include configuration information indicative of cloud components selected for the cloud architecture. The configuration information and the user response information can then be processed with the agentic orchestration model prompted to fulfill the security engineering role to obtain the role output that includes the security control information.

Agentic orchestration models can be further leveraged to perform a variety of other cloud architecture development roles to obtain a variety of different role outputs. Examples of other role outputs include comparison outputs (e.g., a comparison between a proposed cloud architecture and a current cloud architecture), validation outputs (e.g., validating that a proposed cloud architecture is viable), control outputs (e.g., suggested security controls for a proposed cloud architecture), etc. In such fashion, by leveraging models prompted to emulate particular cloud architecting roles, implementations described herein can develop cloud architectures for users while obviating many of the inefficiencies associated with cloud architecture development.

Aspects of the present disclosure provide a number of technical effects and benefits. As one example technical effect and benefit, implementations described herein can substantially reduce the resources required to develop cloud architectures. In addition, implementations described herein can be utilized to validate and verify existing architectures, thus improving efficiency and ensuring that security vulnerabilities are discovered. For example, assume that a user wishes to develop a cloud architecture to provide a particular service. Further assume that the user lacks sufficient resources to develop such a cloud architecture. Using conventional techniques, the user may be forced to develop a sub-optimal architecture, or may refrain from providing the service entirely. However, implementations described herein can be leveraged (e.g., by cloud platforms, etc.) to enable users to effectively and efficiently develop their own cloud architectures. In such fashion, implementations described herein can substantially improve the functioning of cloud computing systems and cloud platforms leveraged to implement such systems.

With reference now to the Figures, example embodiments of the present disclosure will be discussed in further detail.

FIG. 1 depicts an overview block diagram of a computing system for agentically-orchestrated foundational models for cloud architecture development and/or security control selection according to some implementations of the present disclosure. In particular, a computing system 100 can include processor device(s) 102 and memory 104. In some implementations, the computing system 100 may be a computing system that includes multiple computing devices. Alternatively, in some implementations, the computing system 10 may be a distributed network of computing resources. Similarly, the processor device(s) 102 may include any computing or electronic device capable of executing software instructions to implement the functionality described herein. The memory 104 can be or otherwise include any device(s) capable of storing data, including, but not limited to, volatile memory (random access memory, etc.), non-volatile memory, storage device(s) (e.g., hard drive(s), solid state drive(s), etc.).

The memory 104 can include a user interaction module 106. The user interaction module 106 can receive information to a user computing device 108. For example, the user interaction module 106 can generate questionnaire information 110 that describes a cloud architecture questionnaire which includes architecture queries related to requirements of the cloud architecture that the user desires. In response, the user interaction module can receive user response information 111 from the user computing device. The user response information 111 can include user responses to the queries, and can indicate certain cloud architecture requirements for the proposed cloud architecture to fulfill.

Additionally, or alternatively, in some implementations, the user response information 111 can include information provided by the user in some other format. For example, the user response information 111 may include information descriptive of selection of certain interface elements by the user, textual content provided by the user, historical information descriptive of prior interactions from the user, etc.

The memory 104 can include an agentic orchestration module 112. The agentic orchestration module 112 can instantiate, de-instantiate, train, optimize, utilize, and otherwise manage agentic orchestration models 114A-114N (generally, agentic orchestration models 114). As described previously, the agentic orchestration models 114 can be or otherwise include Large Foundational Models (LFMs). As described herein, a LFM refers to a machine-learned model that has been trained on large corpuses of training data, including training data associated with subject matter experts in cloud system architectures. For example, the agentic orchestration models 114 may be large language models trained to generate textual content. For another example, the agentic orchestration models 114 can be multimodal LFMs trained to generate textual content, images, audio, program-specific information (e.g., machine-readable code, machine-readable markup language, etc.), etc.

In some implementations, the user response information 111 can be, or otherwise include, an image, diagram, etc. depicting a cloud architecture and/or generic component placeholders to be included within a proposed cloud architecture. For example, the user response information 111 can be an image depicting a visual representation of an architecture, such as a drawing or sketch produced by a user, that depicts at least some of the generic component placeholders. In this manner, the input can be modified to produce a refined visual representation rather than generating a visual representation de novo. Additionally, the capability to process visual representations of a cloud architecture enables models, such as agentic orchestration models, to iteratively refine the outputs of previous models. In this manner, agentic orchestration models prompted to perform different tasks can iteratively contribute to a visual representation of a cloud architecture to add additional detail and/or validate previous additions from prior models.

The agentic orchestration module 112 can include a prompt generator 116 and a prompt repository 118. The prompt generator 116 can generate prompts for the prompt repository. The prompts stored to the prompt repository can be utilized to prompt the agentic orchestration models 114, or instances thereof, to fulfill certain cloud architecture development roles (i.e., "cloud architecting" roles). Cloud architecting roles can include any type or manner of role typically assigned to an agent, such as an employee, for the purposes of cloud architecture development. Examples of cloud architecting roles include cloud architects, algorithm developers, software engineers, cloud designers, visual designers or artists, back-end developers, security engineers, developer operations specialists, etc.

It should be noted that, although the agentic orchestration models 114 are depicted as being separate models, the agentic orchestration models 114 are not necessarily discrete and independent models. For example, the agentic orchestration models 114 can be instances of the same LFM that are prompted to perform different cloud architecting roles. Alternatively, the agentic orchestration models 114 can be different LFMs (or instances thereof) that are trained, fine-tuned, or otherwise optimized to fulfill a particular cloud architecting role.

In some implementations, the prompt generator 116 may pre-populate the prompt repository 118 with prompts for known roles. Additionally, or alternatively, the prompt generator 116 can generate a prompt based on the type of task specified by the user response information 111. Specifically, in some implementations, the user response information 111 can specify a type of task for the agentic orchestration module to complete, and the prompts provided to the agentic orchestration models 114 can be selected based on the specified task. For example, if the user response information 111 indicates a visual representation task, the prompt generator 116 can generate a cloud design or artist prompt for one of the agentic orchestration models 114. For another example, if the user response information 111 indicates a text generation task (e.g., for a written summary or overview of the proposed cloud architecture), the prompt generator 116 can generate a cloud technical writer or support specialist prompt for one of the agentic orchestration models 114.

In some implementations, the agentic orchestration module 112 can leverage the agentic orchestration models 114 to generate generic component placeholder information 120. The generic component placeholder information 120 can describe proposed generic component placeholders for components necessary to meet the cloud architecture requirements described by the user response information 111. In other words, the generic component placeholder information 120 can describe "types" or "categories" of components that are needed to implement the proposed cloud architecture.

As described herein, a "component" generally refers to a collection of hardware and/or software resources that collectively provide a function or service. For example, assume that a particular type of database is selected for a generic database placeholder. The selected database may be utilized by instantiating that particular type of database using cloud platform resources. Alternatively, the selected database may be utilized by partnering with a database service provider that instantiates and maintains that particular type of database using third-party resources. Examples of proposed generic component placeholders can include a "database" placeholder, a "firewall" placeholder, etc. Cloud components (e.g., a specific database service offering, a specific firewall service offering, etc.) can later be selected to fulfill the proposed generic component placeholders. In such fashion, the agentic orchestration module 112 can leverage the prompt repository 118 and the agentic orchestration models 114 to identify the types of components necessary to implement the proposed cloud architecture while meeting the cloud architecture requirements specified in the user response information 111.

Additionally, in some implementations, the agentic orchestration module 112 can leverage the agentic orchestration models 114 to generate a visual representation 122 of the generic component placeholder information 120. The visual representation 122 can be a diagram of the proposed cloud architecture that depicts the proposed generic component placeholders. For example, the agentic orchestration module 112 can select a prompt from the prompt repository 118 to prompt one of the agentic orchestration models 114 to fulfill a visual design or artist role. Additionally, the visual representation 122 can depict proposed interactions between the generic component placeholders. For example, a proposed interaction may exist between a generic database component placeholder and a generic storage component placeholder (e.g., for storing database backups). The agentic orchestration module 112 can select a prompt from the prompt repository 118 to prompt one of the agentic orchestration models 114 to fulfill a networking role.

In some implementations, the agentic orchestration module 112 can leverage the agentic orchestration models 114 to generate component selection information 124. The component selection information 124 can describe components selected for the placeholders indicated by the generic component placeholder information 120. For example, if the generic component placeholder information 120 includes a generic database placeholder, the component selection information 124 can describe a particular database technology (e.g., a relational database, a non-relational database, etc.) and/or a specific type of database (e.g., Structured Query Language (SQL), mySQL, PostgreSQL, etc.). The component selection information 124 can be generated by prompting one (or more) of the agentic orchestration models 114 with a prompt from the prompt repository 118 that instructs the model to fulfill a database-related role, such as a database engineer role. In some implementations, the component selection information 124 selects a set of cloud services from a plurality of candidate cloud services. Generation of the component selection information will be discussed in greater detail with regards to FIGS. 2-4.

The agentic orchestration module 112 can leverage the agentic orchestration models 114 to generate security control information 126. The security control information 126 can describe controls selected for the selected components indicated by the component selection information 124. For example, assume that the component selection information 124 selects a particular type of database for a corresponding generic database placeholder described by the generic component placeholder information 120. The security control information 126 can describe one or more security controls selected for the particular type of database. The security control information 126 can describe a particular access policy for the database, a particular malicious actor detection technology to utilize in conjunction with the database, a mitigation strategy for a known vulnerability associated with the database, etc. The security control information 126 can be generated by prompting one (or more) of the agentic orchestration models 114 with a prompt from the prompt repository 118 that instructs the model to fulfill a security-related role, such as a cybersecurity engineer role, a developer operations specialist role, etc.

As described previously, in some implementations, the user response information 111 can be, or otherwise include, an image, diagram, etc. depicting a cloud architecture and/or generic component placeholders to be included within a proposed cloud architecture. The agentic orchestration models 114 can be used to process the visual representation to refine the visual representation. For example, assume that the agentic orchestration module 112 processes the user response information 111 with one of the agentic orchestration models 114 prompted to fulfill a database engineering role to obtain a visual representation that depicts a generic database component placeholder. The agentic orchestration module 112 can process the visual representation with one of the agentic orchestration models 114 prompted to fulfill a storage engineering role to obtain a modified visual representation that depicts the generic database component placeholder and the generic storage component placeholder. The agentic orchestration module 112 can process the modified visual representation with another of the agentic orchestration models 114 prompted to fulfill a network engineering role to modify the visual representation such that the visual representation depicts a proposed interaction between the generic database component placeholder and a generic storage component placeholder. The above process can also be leveraged to modify or refine other model outputs described herein, such as the generic component placeholder information 120, the component selection information 124, the security control information 126, etc.

In some implementations, the memory 104 can include a cloud platform module 128. The cloud platform module 128 can deploy the components and controls indicated by the component selection information 124 and the security control information 126, respectively. For example, assume that the computing system 100 is associated with a cloud platform provider. As described previously, a cloud platform provider can generally refer to an entity that provides access to distributed networks of computing resources to implement various cloud services. As such, by deploying the components and controls indicated by the component selection information 124 and the security control information 126, the cloud platform module 128 can deploy a cloud service (and corresponding architecture) for the user computing device 108.

Figure 2:
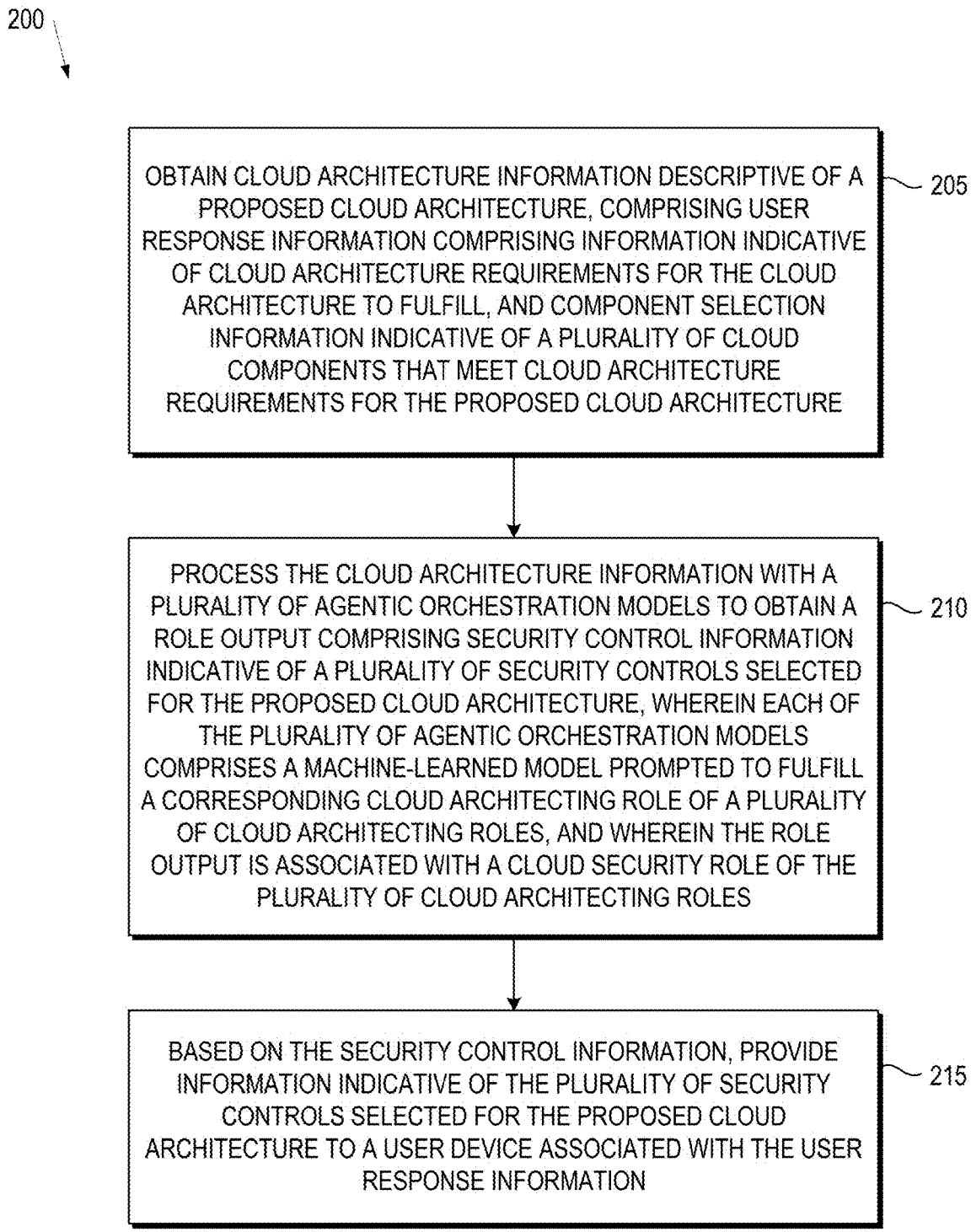
FIG. 2 is a flow diagram of an example method for leveraging agentic orchestration models to select or obtain security controls for a proposed cloud architecture, in accordance with some implementations of the present disclosure.

FIG. 2 is a flow diagram of an example method 200 for leveraging agentic orchestration models to select or obtain security controls for a proposed cloud architecture, in accordance with some implementations of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some implementations, the method 200 is performed by the computing system 100 of FIG. 1. Although shown in a particular sequence or order, unless otherwise specified, the order of the processes can be modified. Thus, the illustrated implementations should be understood only as examples, and the illustrated processes can be performed in a different order, and some processes can be performed in parallel. Additionally, one or more processes can be omitted in various implementations. Thus, not all processes are required in every implementation. Other process flows are possible.

At operation 205, processing logic can obtain cloud architecture information describing a proposed cloud architecture. The cloud architecture information can include user response information. The user response information can include information indicative of cloud architecture requirements for the cloud architecture to fulfill. Cloud architecture "requirements" can generally refer to functionality, operations, processes, security standards, etc. that a cloud architecture is required to support, fulfill, or otherwise implement. For example, a proposed cloud architecture for a cloud-based video streaming service can include a cloud architecture requirement that connections between the cloud architecture and user devices have a minimum bandwidth of twenty megabits per second to support certain video resolutions. For another example, a proposed cloud architecture for a government organization can include a cloud architecture requirement that data stored to the cloud architecture is encrypted using a certain encryption standard. For yet another example, a proposed cloud architecture for a machine learning business entity can include a particular type of hardware resource (e.g., graphics processing units, etc.) to support certain types of operations (e.g., training of machine-learned models).

In some implementations, the user response information can include user-submitted answers to a questionnaire provided to the user. For example, a questionnaire can be provided to the user that includes various questions regarding the identity of the entity requesting the cloud architecture, the purpose of the cloud architecture, various use-cases for the cloud architecture, etc.

The cloud architecture requirements can be determined from the user response information. As described herein, cloud architecture requirements generally refer to some functionality that a proposed cloud architecture must provide, some standard or regulation that a cloud architecture must fulfill, a certain type of component or security control that a cloud architecture must include, etc. For example, the cloud architecture requirements can specify that the proposed cloud architecture must include a database capable of performing 100 interactions per second. For another example, the cloud architecture requirements can specify that the storage component for the cloud architecture complies with European Union privacy regulations. For another example, the cloud architecture requirements can exclude certain software or hardware resources known to possess security vulnerabilities or likely to be insufficiently secure (e.g., certain CPUs with known vulnerabilities, a kernel driver with known vulnerabilities, unverified software packages, etc.). For yet another example, the cloud architecture requirements can require certain communication standards (e.g., end-to-end encryption for communications, obfuscation of user credentials, etc.).

In some implementations, the user response information can be processed using an agentic orchestration model to identify the cloud architecture requirements. For example, assume that the questionnaire asks the user whether the entity requesting the cloud architecture is a governmental organization. If the user response information indicates that the entity is a governmental organization, a cloud architecture requirement for a certain encryption standard required for all governmental organizations can be inferred. For another example, assume that the questionnaire asks the user for an intended use-case for the cloud architecture, and the user response information indicates that the intended use-case is to implement a cloud-based video streaming service. Generally, agentic orchestration models are trained on large corpuses of training data that include information related to minimum bandwidth requirements to support video streaming services (e.g., 5-10 megabits per second for streaming video with a 1080p resolution, etc.). As such, by processing the user response information with an agentic orchestration model that is prompted to fulfill a role that identifies cloud architecture requirements (e.g., a cloud solutions architect), the agentic orchestration model can generate a role output that identifies a cloud architecture requirement for a minimum streaming bandwidth.

The cloud architecture information can also include component selection information for the proposed cloud architecture. The component selection information can indicate a set of cloud components selected to collectively implement the proposed cloud architecture. More specifically, in some implementations, the component selection information can indicate cloud components selected for proposed generic component placeholders for the proposed cloud architecture. For example, the proposed cloud architecture can include a proposed generic database component, or can otherwise indicate that some type of database or the like is needed. The component selection information can indicate a particular database component (e.g., a type of database software) selected for the generic database placeholder from a set of candidate database components.

In some implementations, the processing logic can obtain task selection information. The task selection information can indicate task(s) selected from a set of candidate tasks. For example, the task selection information can indicate a machine-readable configuration file generation task. The machine-readable configuration file generation task can be performed to generate the control configuration information. For another example, the task selection information can indicate a visual representation task. The visual representation task can be performed to generate the visual representation of the security controls. For another example, the task selection information can indicate a control validation task. The control validation task can be performed to validate the selected security controls (e.g., validating that a selected encryption standard is supported by a corresponding component, etc.).

In some implementations, the control validation task can be a framework validation task associated with validating the security controls in accordance with a particular validation framework. For example, the framework validation task can validate that the selected security controls are sufficient to meet or exceed a privacy framework (e.g., General Data Protection Regulation (GDPR), etc.) mandated by a governmental organization. An agentic orchestration model can process the task selection information and the cloud architecture information while prompted to fulfill a particular role, such as a control validation role. Based on the task selection information, the agentic orchestration model can perform the framework validation task to generate control validation information. The control validation information can indicate a validation status for each of the security controls in accordance with the particular validation framework.

In some implementations, the selected task can be a visual representation task. The processing logic can process the cloud architecture information with a particular agentic orchestration model to obtain a visual representation of the proposed cloud architecture. The particular agentic orchestration model can be prompted to fulfill a visual design cloud architecting role, and the visual representation of the proposed cloud architecture can depict associations between the security controls and the cloud components that meet the cloud architecture requirements for the proposed cloud architecture. In some implementations, the visual representation can be provided to a user computing device associated with the user response information. For example, if the user response information is received in response to questionnaire information being sent to a particular user device, the visual representation can be provided to that user device.

In some implementations, the selected task can be a machine-readable configuration file generation task. The processing logic can process the security control information with a particular agentic orchestration model to obtain the control configuration information. The particular agentic orchestration model can be prompted to fulfill a development cloud architecting role. The control configuration information can include a machine-readable configuration file that, when processed, is indicative of the plurality of security controls.

In some implementations, the selected task can be a control deployment task. The processing logic can process the security control information with a particular agentic orchestration model to obtain a control deployment configuration file. The particular agentic orchestration model can be prompted to fulfill a developer operations cloud architecting role. The control deployment configuration file, when processed, can cause deployment of the plurality of security controls. In some implementations, the processing logic can use the control deployment configuration file to deploy the plurality of security controls.

In some implementations, prior to obtaining at least some of the cloud architecture information, the processing logic can process the user response information with a set of preceding agentic orchestration models to obtain a preceding role output that includes proposed architecture information. The proposed architecture information can be indicative of proposed generic component placeholders for components necessary to meet the cloud architecture requirements.

For example, assume that the set of agentic orchestration models includes a model prompted to fulfill a cloud architecture design role. Further assume that the user response information indicates that sensor data will be stored and utilized within the proposed cloud architecture. The model can process the user response information to obtain a role output that includes generic component placeholder information. The generic component placeholder information can propose that a generic storage component is necessary to handle storage of the sensor data. In other words, the generic component placeholder information can indicate that some type of storage component is needed without specifying a particular storage component.

Additionally, in some implementations, the processing logic can process the user response information and the proposed architecture information with the preceding agentic orchestration models to obtain another preceding role output. The other preceding role output can include the component selection information included in the cloud architecture information. The component selection information included in the preceding role output can select cloud components for the proposed generic component placeholders identified by the generic component placeholder information described previously.

At operation 210, the processing logic can process the cloud architecture information with a plurality of agentic orchestration models to obtain a role output. The role output can include security control information that indicates security controls selected for the proposed cloud architecture. Each of the agentic orchestration models can be, or include, a machine-learned model prompted to fulfill a corresponding cloud architecting role. Specifically, the role output can be associated with cloud security role(s) of the plurality of cloud architecting roles. For example, assume that the component selection information indicates a database component and a storage component. In some instances, an agentic orchestration model can be prompted with a general security engineering role and can select security controls for both the database component and the storage component. Alternatively, in some other instances, the agentic orchestration model can be prompted to fulfill a database security engineering role and can select security controls for the database component. The agentic orchestration model (or another agentic orchestration model) can then be prompted to fulfill a storage security engineering role and can select security controls for the storage component.

At operation 215, the processing logic can generate control configuration information indicative of the plurality of security controls. In some implementations, the control configuration information can be machine-readable code, software instructions, a structured data object, etc. that can be utilized to deploy or otherwise implement the security controls selected for the proposed cloud architecture. For example, assume that one of the security controls specifies a certain encryption algorithm for a storage component. In some instances, the control configuration information can be a script that, when executed, applies the encryption algorithm to the data stored to the storage component, or instructs the storage component to utilize the encryption algorithm. Alternatively, in some other instances, the control configuration information can be a structured data object or the like that indicates the selected security control (e.g., a Javascript Object Notation (JSON) object that specifies the encryption algorithm as the selected security control for the storage component, etc.).

Figure 3:
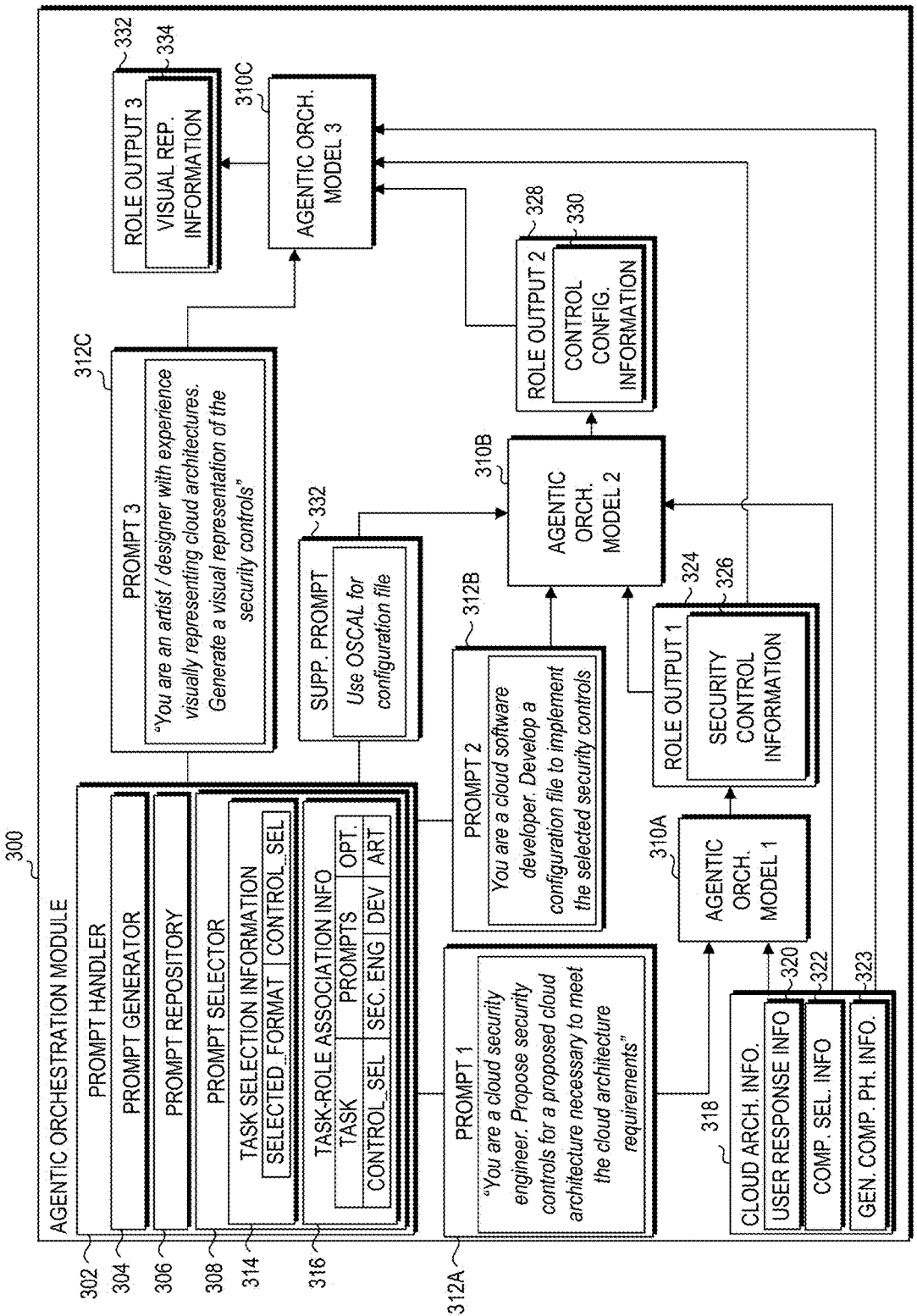
FIG. 3 is a block diagram for an agentic orchestration module for selecting security controls for a proposed cloud architecture according to some implementations of the present disclosure.

FIG. 3 is a block diagram for an agentic orchestration module for selecting security controls for a proposed cloud architecture according to some implementations of the present disclosure. In particular, an agentic orchestration module 300 can be a module implemented by a computing system to implement agentic orchestration of machine-learned models, such as the agentic orchestration module 112 of FIG. 1. The agentic orchestration module 300 can include a prompt handler 302. The prompt handler 302 can include a prompt generator 304 and a prompt repository 306 as described with regards to the prompt generator 116 and prompt repository 118 of FIG. 1.

The prompt handler 302 can include a prompt selector 308. The prompt selector 308 can select prompts to prompt agentic orchestration models 310A-310C (generally, agentic orchestration models 310). As described previously, "agentically orchestrated" models generally refer to machine-learned model instances that fulfill certain cloud architecture development roles typically performed by agents of a cloud service provider or cloud platform (e.g., engineer, designer, artist, security specialist, developer operations specialist, etc.). To "fulfill" a particular role, the model can generate textual content (or other inputs) from the perspective of an agent that fulfills that particular role. For example, if prompted to fulfill a cloud engineering role, the model can generate textual content from the perspective of a cloud engineer. In other words, the model can emulate a "typical" agent that fulfills that particular role when generating content.

In some implementations, an agentic orchestration model can be prompted to fulfill a particular role with a prompt that describes the role. For example, an agentic orchestration model can be prompted with textual content. The textual content can describe the role itself (e.g., responsibilities, required certifications or credentials, knowledge, skills, etc.). Additionally, the textual content can describe characteristics of employees that typically fulfill such a role (e.g., average years of experience, age, educational background, personality traits, common types of team members, degree of expertise in certain fields, etc.). Additionally, or alternatively, in some implementations, the textual content can describe the use-case for the cloud architecture, the entity requesting the cloud architecture, etc. In this manner, the agentic orchestration model can adjust selection of security controls based on a contextual understanding of the intent of the cloud architecture. For example, the agentic orchestration model is likely to select more restrictive security controls for more sensitive use-cases (e.g., production, manufacturing environments, etc.).

It should be noted that, although the agentic orchestration models 310 are depicted as fulfilling particular roles in response to receiving prompts, other techniques can also be utilized to cause the agentic orchestration models 310 to fulfill the particular roles. For example, an agentic orchestration model can be optimized to fulfill a role via a training or fine-tuning process that adjusts weights of the model's parameters. For another example, the agentic orchestration model can be restricted to accessing information provided by subject matter experts within the domain of cloud architecture design and related fields (e.g., in conjunction with vector databases, etc.).

The prompt selector 308 can select prompts 312 for the agentic orchestration models 310. In some implementations, the prompt selector 308 can select the prompts 312 based on task selection information 314. The task selection information 314 can be information indicative of a particular task for the agentic orchestration module 300 to perform. Specifically, as depicted, the task selection information can indicate performance of a security control selection task. To perform the security control selection task, a prompted model can process a set of inputs to obtain security control information indicating security controls for the proposed cloud architecture.

For example, assume that the agentic orchestration module 300 can perform a variety of different tasks, such as selecting security controls for a proposed cloud architecture, selecting components for generic component placeholders, generating a visual diagram of a proposed cloud architecture, generating a textual summary of the architecture, performing a comparative analysis between a proposed cloud architecture and a different cloud architecture, etc. The task selection information 314 can indicate one (or more) of the tasks for the agentic orchestration module 300 to perform. Additionally, or alternatively, in some implementations, the task selection information 314 can indicate a particular format for an output requested from the agentic orchestration module. For example, the task selection information can indicate a particular format for security control configuration information.

In some implementations, the prompt selector 308 can include task-role association information 316. The task-role association information 316 can describe the roles of agents that can collectively perform a particular task. Based on the task-role association information 316, the prompt selector 308 can select the prompts 312 to provide to the agentic orchestration models. Additionally, or alternatively, in some implementations, the agentic orchestration module 300 can select agentic orchestration models already optimized to fulfill the roles indicated by the task-role association information 316.

To follow the depicted example, the task selection information 314 can indicate a security control selection task. The task-role association information 316 can indicate that a security engineering role and a developer role are required to fulfill the security control selection task. The task-role association information 316 can further indicate that an artist role can also be fulfilled optionally. In response, the prompt selector 308 can select the prompts 312 to prompt the agentic orchestration model 310A to perform a security engineering role and prompt the agentic orchestration model 310B to perform the developer role.

In some implementations, the task-role association information 316 can describe an order in which the agentic orchestration models 310 are to be utilized. More specifically, when multiple agentic orchestration models are utilized, the models can successively process the outputs of preceding models as inputs to "conversationally" utilize the outputs of preceding models as context. For example, if an agentic orchestration model prompted to fulfill a security engineering role generates security control information that selects security controls for the proposed cloud architecture, a subsequent agentic orchestration model prompted to fulfill a developer role can process the security control information to generate control configuration information that causes deployment of the selected security controls. As such, the task-role association information 316 can indicate an order in which the agentic orchestration models 310 are to be utilized. The task-role association information 316 can also indicate whether an agentic orchestration model is to take some other model's output as an input.

The agentic orchestration module 300 can obtain cloud architecture information 318. The cloud architecture information 318 can be descriptive of particular cloud architecture requirements to be fulfilled by the proposed cloud architecture. In some implementations, some (or all) of the cloud architecture information 318 can be provided by a user. Specifically, the cloud architecture information 318 can include user response information 320 received in response to a query (or multiple queries) provided to a user. For example, a user can be provided with a questionnaire that includes multiple queries to the user regarding the cloud architecture to be proposed (e.g., intended use-cases, characteristics of the requesting entity, predicted user characteristics, etc.). The particular cloud architecture requirements can be described by, or otherwise inferred from, the user response information 320. For example, the user response information 320 can be processed with a machine-learned model (e.g., the agentic orchestration model 310A, etc.) to identify the cloud architecture requirements. Alternatively, in some implementations, the user response information 320 can be obtained from a source other than a user. For example, the user response information 320 can be generated by an automated process.

The cloud architecture information 318 can further include component selection information 322. The component selection information 322 can be indicative of selected cloud components that meet the cloud architecture requirements for the proposed cloud architecture. In some implementations, the cloud architecture information 318 can include generic component placeholder information 323. The generic component placeholder information 323 can describe generic placeholders for particular "types" of components that are to be later selected. For example, the generic component placeholder information 323 may include a generic component placeholder for a database component without specifying which type of database is to be selected. For another example, the generic component placeholder information 323 may include a generic component placeholder for a type of database component (e.g., a relational database) without specifying which particular sub-type of the type of database is to be selected (e.g., PostgreSQL, mySQL, etc.). As such, it should be generally understood that the generic component placeholder information 323 can indicate generic placeholder components with varying degrees of specificity.

In some implementations, the generic component placeholder information 323 can be generated based on the user response information 320 (and/or user response information received prior to the user response information 320. For example, assume that the agentic orchestration models 310A (or a preceding set of agentic orchestration model(s)) are prompted to fulfill a cloud architecting role (e.g., a cloud architecture designer role) that generates the generic component placeholder information 323. A preceding set of agentic orchestration model(s) can process the user response information 320 (and/or user response information received prior to the user response information 320) to generate the generic component placeholder information 323. The generic component placeholder information 323 can identify generic component placeholders based on the cloud architecture requirements described by the user response information 320. For example, if the user response information 320 indicates that the proposed cloud architecture will be for a video streaming service, the generic component placeholder information 323 can identify a generic video encoder placeholder for some type of video encoder.

The component selection information 322 can be generated based on the generic component placeholder information 323. Specifically, the generic component placeholder information 323 can identify generic component placeholders, and the component selection information 322 can select a component for each of the generic component placeholders. To follow the previous example, once generated, the generic component placeholder information 323 (and, in some instances, the user response information 320) can be processed with the same (or a different) preceding set of agentic orchestration models to generate the component selection information 322. The component selection information 322 can include a proposed video encoder component selected to fulfill the generic video encoder placeholder component from a set of candidate cloud components. The set of candidate cloud components can include various types of video encoders, and the component selection information 322 can select one of the candidate cloud components for the generic video encoder placeholder component.

The prompt selector 308 can select the prompt 312A for the agentic orchestration model 310A to process. The prompt 312A selected for the agentic orchestration model 310A can include textual content describing a cloud security engineer role and instructions to perform while fulfilling the cloud security engineer role. Specifically, the prompt 312A can instruct the agentic orchestration model 310A to propose security controls for a proposed cloud architecture. The prompt 312A can further instruct the agentic orchestration model 310A to select security controls that meet the proposed cloud architecture requirements.

In turn, processing the prompt 312A can cause the agentic orchestration model 310A to process successive (or concurrent) inputs while fulfilling a cloud security engineer role. In other words, the agentic orchestration model 310A can generate outputs from the perspective of a cloud security engineer. To follow the depicted example, the agentic orchestration module 300 can utilize the agentic orchestration model 310A to process the prompt 312A and the cloud architecture information 318 to obtain a role output 324. As described herein, a "role output" generally refers to a type of "output" or "work" typically produced by an agent in the role being fulfilled by the agentic orchestration model. For example, the role output for an agentic orchestration model fulfilling a network engineer role can include a configuration file specifying various networking parameters. For another example, the role output for an agentic orchestration model fulfilling a visual artist role can include a visual representation of security controls selected for a cloud architecture.

The role output 324 can include security control information 326. The security control information 326 can indicate security controls selected for the proposed cloud architecture. The security controls described by the security control information 326 can take various forms. For example, the security controls can include technical controls, such as firewalls, encryption protocols, intrusion detection systems. For another example, the security controls can include procedural controls, such as security policies, tiered access policies, user training, incident response plans, compliance frameworks, etc. It should be noted that procedural controls can be implemented using software instructions. For example, a tiered access policy can be implemented by assigning users to certain "tiers" with different access privileges.

In some implementations, the security control information 326 can specify configurations, parameters, characteristics, etc. of security controls selected for the proposed cloud architecture. For example, assume that the security control information 326 describes a security control selected for a storage component. The security control information 326 can mandate encryption of data stored to the storage component. The security control information 326 can further specify a type of encryption scheme, or a particular encryption scheme, to be applied. For another example, assume that the security control information 326 describes a security control selected for a user account management module that handles registration of user accounts. The security control information 326 can mandate utilization of certain verification technologies (e.g., human verification such as a CAPTCHA challenge, etc.). The security control information 326 can further specify other required verification techniques, such as requiring the user to submit identifying documents (e.g., a birth certificate, driver's license, etc.).

In some implementations, the generic component placeholder information 323 and/or the component selection information 322 can identify proposed "interactions" between selected cloud components for the proposed cloud architecture. As described herein, a proposed "interaction" can refer to proposed communications or exchanges of information between the components selected to fulfill the generic component placeholders (e.g., a generic database component placeholder, a generic security component placeholder, a generic virtualization component placeholder, etc.). For example, assume that the component selection information 322 selects a storage component and a logging component (e.g., to generate interaction logs). The proposed interactions will likely include a proposed interaction between the generic logging component and the generic storage component because a logging component is likely to communicate logs to a storage component for long-term storage. Conversely, if one of the generic component placeholders is a generic interface firewall component placeholder, it is less likely that the proposed interactions include a proposed interaction between the generic interface firewall component placeholder and the generic logging component placeholder.

Additionally, or alternatively, in some implementations, the proposed interactions identified by the generic component placeholder information 323 and/or the component selection information 322 can describe communication characteristics for communications between the generic component placeholders (or the components to be selected for those placeholders). Examples of communication characteristics can include latency, bandwidth, communication frequency, necessary security protocols, necessary operations for regulatory compliance (e.g., deleting or obfuscating communications for privacy purposes, etc.), etc. For example, the proposed interactions can specify a bandwidth to be configured for communications between components selected for two of the generic component placeholders (e.g., a bandwidth of 10 Mbps for communications between a generic database placeholder and a generic storage placeholder). Additionally, or alternatively, in some implementations, the proposed interactions can specify minimum and/or maximum values for certain communication characteristics. To follow the previous example, the proposed interactions can specify a minimum bandwidth and a maximum bandwidth to be configured for communications between components selected for the two generic component placeholders.

In some implementations, the security control information 326 can describe security controls for the proposed "interactions" between the selected cloud components described by the generic component placeholder information 323 and/or the component selection information 322. To follow the previous example, given the proposed interaction between the storage component and the logging component, the security control information 326 can specify a particular encryption scheme to be applied to information exchanged between the components. Additionally, or alternatively, the security control information 326 can specify or control other characteristics of information exchanges that occur between the storage and logging components. Examples of such characteristics include hop limits (e.g., if information is exchanged via the internet), types of backend infrastructure (e.g., avoiding network nodes that use certain types of hardware, etc.), the type of information being exchanged (e.g., restricting the exchange of sensitive user information), etc.

The prompt selector 308 can select the prompt 312B for the agentic orchestration model 310B to process. The prompt 312B selected for the agentic orchestration model 310B can include textual content describing a cloud software developer role and instructions to perform while fulfilling the cloud software developer role. Specifically, the prompt 312B can instruct the agentic orchestration model 310B to develop a configuration file to implement the security controls described by the security control information 326.

In turn, processing the prompt 312B can cause the agentic orchestration model 310B to process successive (or concurrent) inputs while fulfilling the cloud software developer role. To follow the depicted example, the agentic orchestration module 300 can utilize the agentic orchestration model 310B to process the prompt 312B and the security control information 326 to obtain a role output 328. The role output 328 can include control configuration information 330. The control configuration information 330 can be, or otherwise include, machine-readable code, software instructions, a structured data object, etc. that can be utilized to deploy or otherwise implement the security controls selected for the proposed cloud architecture. For example, assume that one of the security controls specifies a certain encryption algorithm for a storage component. In some instances, the control configuration information 330 can be a script that, when executed, applies the encryption algorithm to the data stored to the storage component, or instructs the storage component to utilize the encryption algorithm. Alternatively, in some other instances, the control configuration information 330 can be a structured data object or the like that indicates the selected security control (e.g., a Javascript Object Notation (JSON) object that specifies the encryption algorithm as the selected security control for the storage component, etc.).

In some implementations, the control configuration information 330 can be a script or the like that, when executed, causes deployment of a security control. For example, the control configuration information 330 may be a script or data object (e.g., YAML, JSON, REGO, etc.) that, when executed, causes allocation of computing resources for a firewall software instance, causes firewall software to be installed, and/or causes an instance of the firewall software to be instantiated. For another example, the control configuration information 330 may be a script that, when executed, causes a service instantiation request to be provided to a third-party firewall service provider. As such, it should be generally understood that the control configuration information 330 can cause configuration and/or deployment of security controls directly and/or indirectly through interactions with third-party services.

In some implementations, the prompt selector 308 can select a supplemental prompt 332 to provide to the agentic orchestration model alongside the prompt 312B. The supplemental prompt 332 can include task-specific information or instructions for the agentic orchestration model 310B. To follow the depicted example, the supplemental prompt 332 can specify a Open Security Controls Assessment Language (OSCAL) format be used by the agentic orchestration model 310B to generate the control configuration information 330. In turn, the agentic orchestration model 310B can generate an OSCAL configuration file.

In some implementations, the prompt selector 308 can select prompt 312C for agentic orchestration model 310C to process. The prompt 312C selected for the agentic orchestration model 310B can include textual content describing a visual artist role and instructions to perform while fulfilling the visual artist role. Specifically, the prompt 312C can instruct the agentic orchestration model 310C to generate a visual representation of the security controls (and, in some instances, other portions of the cloud architecture) based on the security control information 326 and/or the control configuration information 330. Based on the prompt 312C, the agentic orchestration model 310C can process the security control information 326 to obtain a role output 332 that includes visual representation information 334.

The visual representation information 334 can include image(s) that depict a proposed cloud architecture that includes the security controls indicated by the security control information 326 and the cloud components indicated by the component selection information 322. Alternatively, in some implementations, the visual representation information 334 can include software instructions (i.e., programmatic code, machine-readable code, etc.) that, when processed or executed, can produce an image or interactable representation of the proposed generic component placeholders and the proposed interactions.

Figure 4:
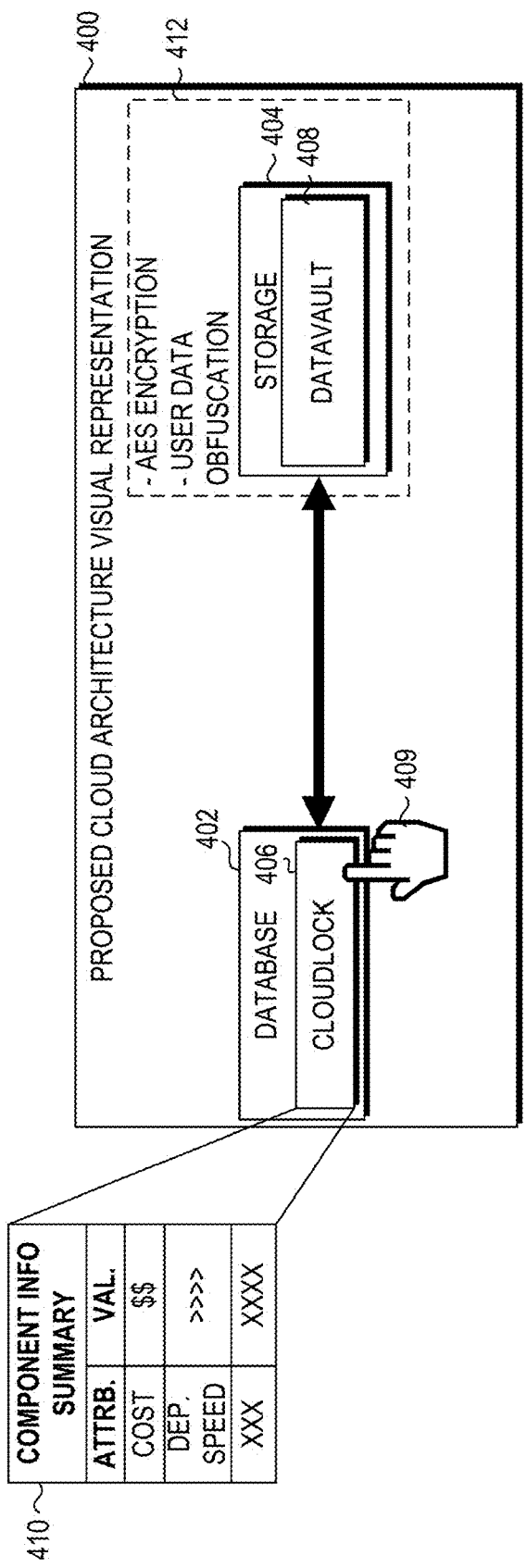
FIG. 4 illustrates an example visual representation of a proposed cloud architecture diagram with cloud components selected for generic component placeholders according to some implementations of the present disclosure.

Turning to FIG. 4 for a specific example, FIG. 4 illustrates an example visual representation of a proposed cloud architecture diagram with cloud components selected for generic component placeholders according to some implementations of the present disclosure. As illustrated, visual representation 400 can be a visual representation (e.g., an image, a series of images, video data, renderable software instructions, etc.) that depicts a proposed cloud architecture diagram. Alternatively, the visual representation 400 can be a proposed cloud architecture diagram implemented by (or renderable from) software instructions. The visual representation 400 can depict proposed generic component placeholders and corresponding proposed interactions that are determined as described with regards to FIG. 3.

The visual representation 400 can include generic component placeholder elements 402 and 404. The generic component placeholder elements 402 and 404 can identify proposed generic component placeholders, such as the placeholders described by the generic component placeholder information 323 of FIG. 3. The generic component placeholder elements 402 and 404 can serve as visual indicators to the user that particular types of components are needed to create a cloud architecture that meets the cloud architecture requirements. The generic component placeholder elements can include selected cloud component elements 406 and 408. The selected cloud component elements 406 and 408 can serve as visual indicators to the user of the particular cloud components that have been selected to fulfill the generic component placeholders as indicated by the component selection information 322 of FIG. 3.

To follow the depicted example, the visual representation 400 can include a generic database firewall placeholder element 402 and a generic storage placeholder element 404. A selected cloud component element 406 can be depicted within the generic database firewall placeholder element 402 to indicate that the selected cloud component element 406 has been selected to fulfill the generic database firewall placeholder element 402. Specifically, the selected cloud component element 406 can indicate that a "CLOUD-LOCK" cloud component has been selected for the generic database firewall placeholder component 402. Similarly, selected cloud component element 408 can be depicted within the generic database placeholder element 404 to indicate that the selected cloud component element 408 (e.g., "DATAVAULT") has been selected to fulfill the generic storage placeholder element 404.

In some implementations, the selected cloud component element 406 can be selectable by a user. For example, assume that the visual representation 400 is provided for display at a user device. The user can provide an input via a user input device to move a cursor element 409 to select the selected cloud component element 406. The selected cloud component element 406 can include a supplemental information element 410 that can be configured to be displayed upon selection of the selected cloud component element 406. The supplemental information element 410 can include supplemental information descriptive of the selected cloud component. In this manner, the user can independently evaluate the merits of the cloud component indicated by the selected cloud component element 406.

The visual representation 400 can depict a security control element 412. The security control element 412 can indicate the existence of a security control assigned to a particular cloud component and/or interaction between cloud components. The security control element 412 can indicate particular characteristics of the security control assigned to the datavault cloud component indicated by the selected cloud component element 408. To follow the depicted example, the security control element 412 can indicate that Advanced Encryption Standard (AES) encryption is to be applied to data stored to the storage component and/or to information exchanged by the storage component. The security control element 412 can further indicate that user data obfuscation is to be applied to user data stored to the storage component. In this manner, the user can efficiently and effectively determine the type of security controls to be applied to the proposed cloud architecture.

Figure 5:
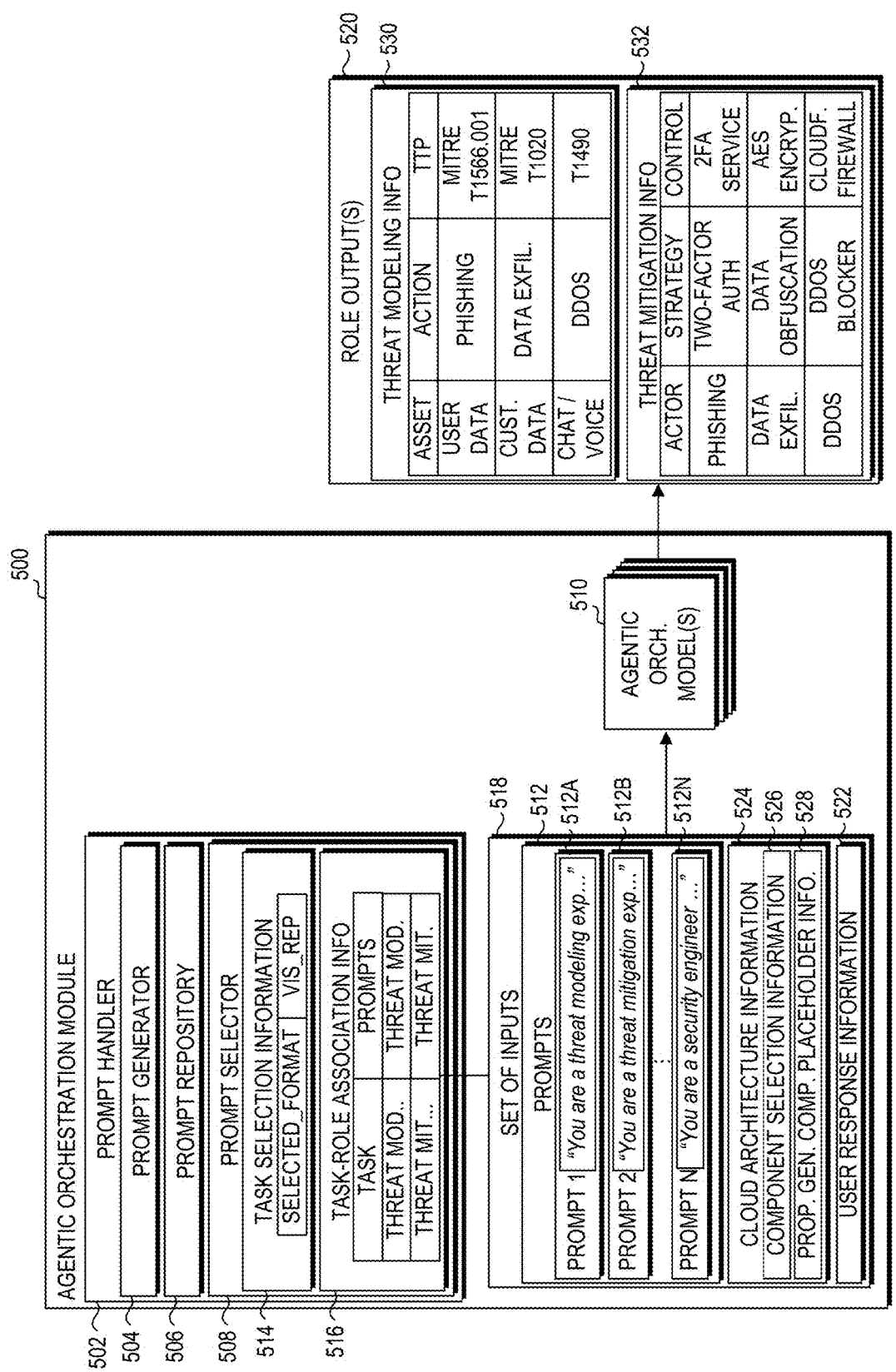
FIG. 5 is a block diagram for utilizing the agentic orchestration module to perform security-related tasks according to some implementations of the present disclosure.

FIG. 5 is a block diagram for utilizing the agentic orchestration module to perform security-related tasks according to some implementations of the present disclosure. FIG. 5 will be discussed in conjunction with FIG. 3. In particular, agentic orchestration module 500 can be a module implemented by a computing system to implement agentic orchestration of machine-learned models, as described with regards to the agentic orchestration module 300 of FIG. 3. Similarly, the agentic orchestration module 500 can include a prompt handler 502, prompt generator 504, prompt repository 506, prompt selector 508, one or more agentic orchestration model(s) 510, prompts 512, task selection information 514, task-role association information 516, etc. to implement functionality as described with regards to FIG. 3.

The agentic orchestration module 500 can include the same manner of task selection information 514 as the task selection information 314 of FIG. 3. However, unlike the task selection information 314, which described a visual representation task, the task selection information 514 can describe various security tasks, such as a threat modeling task and a threat mitigation task. The threat modeling task can be a task to "model" threats. As described herein, "modeling" a threat can refer to predicting a type of malicious action likely to be performed against a type of asset stored or protected by the proposed cloud architecture. For example, a threat modeling output can predict that a Distributed Denial-of-Service (DDOS) attack is likely to be applied to chat or voice infrastructure implemented by the proposed cloud architecture.

Similarly, the threat mitigation task can be a task to "mitigate" threats. As described herein, "mitigating" a threat can refer to a strategy and/or security control capable of mitigating a predicted type of malicious action likely to be performed against the type of asset stored or protected by the proposed cloud architecture. For example, if the threat modeling output predicts that a DDOS attack against chat or voice infrastructure implemented by the proposed cloud architecture, the threat mitigation output can indicate a particular security control (e.g., a cloud-based firewall) that is likely sufficient to defeat or mitigate DDOS attacks. The agentic orchestration module 500 can also include the same manner of task-role association information 516 as the task-role association information 316 of FIG. 3. However, unlike the task-role association information 316, which describes roles sufficient to perform a component selection task, the task-role association information 516 can describe roles sufficient to perform a threat modeling task and a threat mitigation task.

It should be noted that the task selection information 514 can indicate tasks other than threat modeling and threat mitigation. Specifically, in some implementations, the task selection information 514 can indicate performance of a control deployment task associated with implementation and/or deployment of the security controls. For example, given a particular firewall component as a security control, the task selection information 514 can instruct a receiving model to generate instructions that can cause a package manager (e.g., Node Package Manager (NPM), etc.) to install and deploy the firewall component.

Additionally, or alternatively, in some implementations, the task selection information 514 can indicate performance of a component validation task associated with validation of the selected cloud components in accordance with a particular component validation framework. A component validation framework can generally refer to a set of guidelines or regulations for cloud components to be included in the proposed cloud architecture. Component validation frameworks can be utilized to verify the existence sufficient security, and/or to ensure compliance with certain standards (e.g., governmental standards, organizational standards, etc.). In this manner, implementations described herein can verify that proposed cloud components are compliant with current regulations and requirements.

For example, assume that a security-based framework is utilized which requires all software packages selected for the proposed cloud architecture to be regularly maintained. The agentic orchestration model(s) can perform the task by identifying a date on which each cloud component was last updated or actively maintained. For example, assume that a security-based framework is utilized which requires all software packages selected for the proposed cloud architecture to be regularly maintained. The agentic orchestration model(s) can perform the task by identifying a date on which each cloud component was last updated or actively maintained. Because outdated software packages are generally more likely to include security vulnerabilities, the component verification task can be performed to mitigate the risk of security vulnerabilities caused by outdated software packages.

Additionally, or alternatively, in some implementations, the task selection information 514 can indicate performance of a control validation task associated with validation of the selected security controls in accordance with a particular control validation framework. A control validation framework can generally refer to a set of guidelines or regulations for security controls to be included in the proposed cloud architecture. Control validation frameworks can be utilized to verify the existence of sufficient security, and/or to ensure compliance with certain standards (e.g., governmental standards, organizational standards, etc.). For example, assume that a selected security control mandates that a user submits certain identifying documents. Further assume that user submission of those documents is restricted by a recently passed control validation framework (e.g., privacy regulations implemented by a governmental institution, etc.). Based on the framework, the agentic orchestration model can determine that the security control is impermissibly restricted, and in response, select a substitute security control less likely to be restricted by the control framework.

The agentic orchestration module can obtain a set of inputs 518. The set of inputs 518 can be processed by the one or more agentic orchestration model(s) 510 to obtain one or more corresponding role output(s) 520. The set of inputs can include the prompts 512A-512N (generally, prompts 512). In some implementations, the set of inputs can include user response information 522. The user response information 522 can describe user responses to queries related to desired cloud feature offerings and architecture requirements for a cloud architecture desired by a user. In some implementations, the user response information 522 can include the same information as the user response information 320 of FIG. 3.

Alternatively, in some implementations, the user response information 522 can include responses to queries provided to the user subsequently or concurrently with generation of the user response information 320 of FIG. 3. As described in FIG. 3, the user response information 320 can be obtained in response to a questionnaire regarding features and requirements for a cloud architecture desired by the user, and can be processed using the agentic orchestration models 310 to obtain the security control information 326. Based on the cloud architecture information 318 of FIG. 3, additional queries can be provided to the user to obtain the user response information 522.

For example, if the cloud architecture information describes a selected cloud component, the additional queries can query the user regarding desired security implementations and requirements for the cloud component (e.g., "what type of data is being stored?", "how important is the data being stored?", "is the information valuable to malicious actors??", etc.). Based on the user's responses to the additional queries, certain security controls can be removed from or added to from a pool of candidate security controls to select for the cloud component (e.g., removing security controls known to be insufficient for protecting sensitive information if the user indicates that sensitive information is being stored, etc.).

The set of inputs 518 can include cloud architecture information 524. In some implementations, the cloud architecture information 524 can include the same information as the cloud architecture information 318 of FIG. 3. For example, the proposed architecture information 524 can include component selection information 526 and proposed generic component placeholder information 528. The agentic orchestration model(s) 510 can process the set of inputs 518 to obtain the role output(s) 520.

The role output(s) 520 can include threat modeling information 530. The threat modeling information 530 can describe assets to be included within the proposed cloud architecture and threat actions likely to be taken against the assets. To follow the depicted example, the threat modeling information 530 can indicate that user data is an asset being stored within the proposed cloud architecture, and that a phishing threat action is likely to be taken against the user data. In some implementations, the threat modeling information 530 can further indicate Tactics, Techniques, and Procedures (TTPs) corresponding to the actions. TTPs can describe the behavior of a threat actor (e.g., phishing, etc.) and a structured framework for executing a cyberattack or malicious action. To follow the depicted example, the threat modeling information can include a MITRE TTP corresponding to phishing attacks.

The role output(s) 520 can include threat mitigation information 532. The threat mitigation information 532 can be based at least in part on the threat modeling information 530. For example, the agentic orchestration module 500 can process prompt 512A and the set of inputs 518 with one of the agentic orchestration model(s) 510 to obtain the threat modeling information 530. The agentic orchestration module 500 can then process the prompt 512B and the threat modeling information 530 (and, in some instances, some or all of the set of inputs 518) with one of the agentic orchestration model(s) 510 to obtain the threat mitigation information 532.

The threat mitigation information 532 can describe mitigation strategies and/or controls to mitigate threat actions or actors predicted by the threat modeling information 530. For example, the threat modeling information 530 predicts a phishing attack against the user data asset. In response, the threat mitigation information 532 can indicate or suggest a two-factor authentication strategy to mitigate phishing attacks against the user data. Additionally, the threat mitigation information 532 can indicate a particular security control (e.g., a particular two-factor authentication service) to utilize to mitigate phishing attacks. For another example, the threat modeling information 530 predicts a data exfiltration attack against a customer data asset. In response, the threat mitigation information 532 can indicate or suggest a data obfuscation strategy to mitigate data exfiltration attacks against the customer data. Additionally, the threat mitigation information 532 can indicate a particular security control (e.g., a particular data obfuscation control, such as AES encryption) to utilize to mitigate phishing attacks.

Figure 6A:
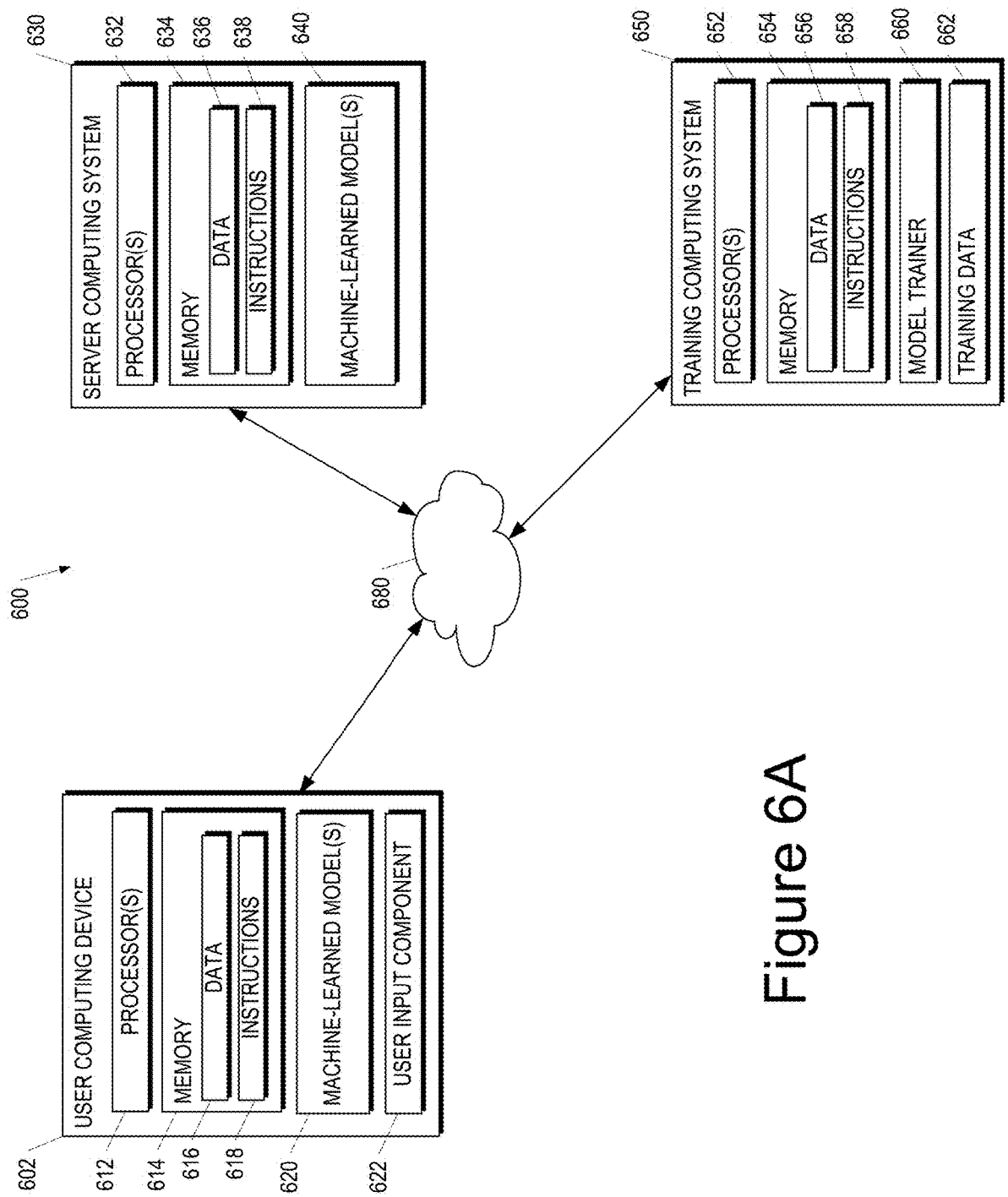
FIG. 6A depicts a block diagram of an example computing system that performs agentic orchestration according to some implementations of the present disclosure.

FIG. 6A depicts a block diagram of an example computing system 600 that performs agentic orchestration according to some implementations of the present disclosure. The system 600 includes a user computing device 602, a server computing system 630, and a training computing system 650 that are communicatively coupled over a network 680.

The user computing device 602 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 602 includes one or more processors 612 and a memory 614. The one or more processors 612 can be any suitable processing device (e.g., a processor core, a microprocessor, an ASIC, an FPGA, a controller, a microcontroller, etc.) and can be one processor or a plurality of processors that are operatively connected. The memory 614 can include one or more non-transitory computer-readable storage media, such as RAM, ROM, EEPROM, EPROM, flash memory devices, magnetic disks, etc., and combinations thereof. The memory 614 can store data 616 and instructions 618 which are executed by the processor 612 to cause the user computing device 602 to perform operations.

In some implementations, the user computing device 602 can store or include one or more machine-learned agentic orchestration models 620. For example, the agentic orchestration models 620 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models). In some implementations, the agentic orchestration models 620 can be Large Foundational Models (LFMs) that are trained on large corpuses of training data to generate multimodal inputs (e.g., large language models, large vision models, large multimodal models, etc.). Example agentic orchestration models 620 are discussed with reference to FIGS. 1-6.

In some implementations, the one or more agentic orchestration models 620 can be received from the server computing system 630 over network 680, stored in the user computing device memory 614, and then used or otherwise implemented by the one or more processors 612. In some implementations, the user computing device 602 can implement multiple parallel instances of a single agentic orchestration model 620 (e.g., to perform parallel agentic orchestration across multiple instances of the agentic orchestration model 620).

Additionally or alternatively, one or more agentic orchestration models 640 can be included in or otherwise stored and implemented by the server computing system 630 that communicates with the user computing device 602 according to a client-server relationship. For example, the agentic orchestration models 640 can be implemented by the server computing system 630 as a portion of a web service (e.g., a cloud architecture design service). Thus, one or more models 620 can be stored and implemented at the user computing device 602 and/or one or more models 640 can be stored and implemented at the server computing system 630.

The user computing device 602 can also include one or more user input components 622 that receives user input. For example, the user input component 622 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 630 includes one or more processors 632 and a memory 634. The one or more processors 632 can be any suitable processing device (e.g., a processor core, a microprocessor, an ASIC, an FPGA, a controller, a microcontroller, etc.) and can be one processor or a plurality of processors that are operatively connected. The memory 634 can include one or more non-transitory computer-readable storage media, such as RAM, ROM, EEPROM, EPROM, flash memory devices, magnetic disks, etc., and combinations thereof. The memory 634 can store data 636 and instructions 638 which are executed by the processor 632 to cause the server computing system 630 to perform operations.

In some implementations, the server computing system 630 includes or is otherwise implemented by one or more server computing devices. In instances in which the server computing system 630 includes plural server computing devices, such server computing devices can operate according to sequential computing architectures, parallel computing architectures, or some combination thereof.

As described above, the server computing system 630 can store or otherwise include one or more agentic orchestration models 640. For example, the models 640 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models). Example models 640 are discussed with reference to FIGS. 1-6.

The user computing device 602 and/or the server computing system 630 can train the models 620 and/or 640 via interaction with the training computing system 650 that is communicatively coupled over the network 680. The training computing system 650 can be separate from the server computing system 630 or can be a portion of the server computing system 630.

The training computing system 650 includes one or more processors 652 and a memory 654. The one or more processors 652 can be any suitable processing device (e.g., a processor core, a microprocessor, an ASIC, an FPGA, a controller, a microcontroller, etc.) and can be one processor or a plurality of processors that are operatively connected. The memory 654 can include one or more non-transitory computer-readable storage media, such as RAM, ROM, EEPROM, EPROM, flash memory devices, magnetic disks, etc., and combinations thereof. The memory 654 can store data 656 and instructions 658 which are executed by the processor 652 to cause the training computing system 650 to perform operations. In some implementations, the training computing system 650 includes or is otherwise implemented by one or more server computing devices.

The training computing system 650 can include a model trainer 660 that trains the machine-learned models 620 and/or 640 stored at the user computing device 602 and/or the server computing system 630 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated backpropagation through time. The model trainer 660 can perform a number of generalization techniques (e.g., weight decays, dropouts, etc.) to improve the generalization capability of the models being trained. In particular, the model trainer 660 can train the agentic orchestration models 620 and/or 640 based on a set of training data 662.

In some implementations, if the user has provided consent, the training examples can be provided by the user computing device 602. Thus, in such implementations, the model 620 provided to the user computing device 602 can be trained by the training computing system 650 on user-specific data received from the user computing device 602. In some instances, this process can be referred to as personalizing the model.

The model trainer 660 includes computer logic utilized to provide desired functionality. The model trainer 660 can be implemented in hardware, firmware, and/or software controlling a general purpose processor. For example, in some implementations, the model trainer 660 includes program files stored on a storage device, loaded into a memory and executed by one or more processors. In other implementations, the model trainer 660 includes one or more sets of computer-executable instructions that are stored in a tangible computer-readable storage medium such as RAM, hard disk, or optical or magnetic media.

The network 680 can be any type of communications network, such as a local area network (e.g., intranet), wide area network (e.g., Internet), or some combination thereof and can include any number of wired or wireless links. In general, communication over the network 680 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be statistical data. Statistical data can be, represent, or otherwise include data computed and/or calculated from some other data source. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some cases, the input includes visual data and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

In some cases, the input includes audio data representing a spoken utterance and the task is a speech recognition task. The output may comprise a text output which is mapped to the spoken utterance. In some cases, the task comprises encrypting or decrypting input data. In some cases, the task comprises a microprocessor performance task, such as branch prediction or memory address translation.

FIG. 6A illustrates one example computing system that can be used to implement the present disclosure. Other computing systems can be used as well. For example, in some implementations, the user computing device 602 can include the model trainer 660 and the training dataset 662. In such implementations, the models 620 can be both trained and used locally at the user computing device 602. In some of such implementations, the user computing device 602 can implement the model trainer 660 to personalize the models 620 based on user-specific data.

Figure 6B:
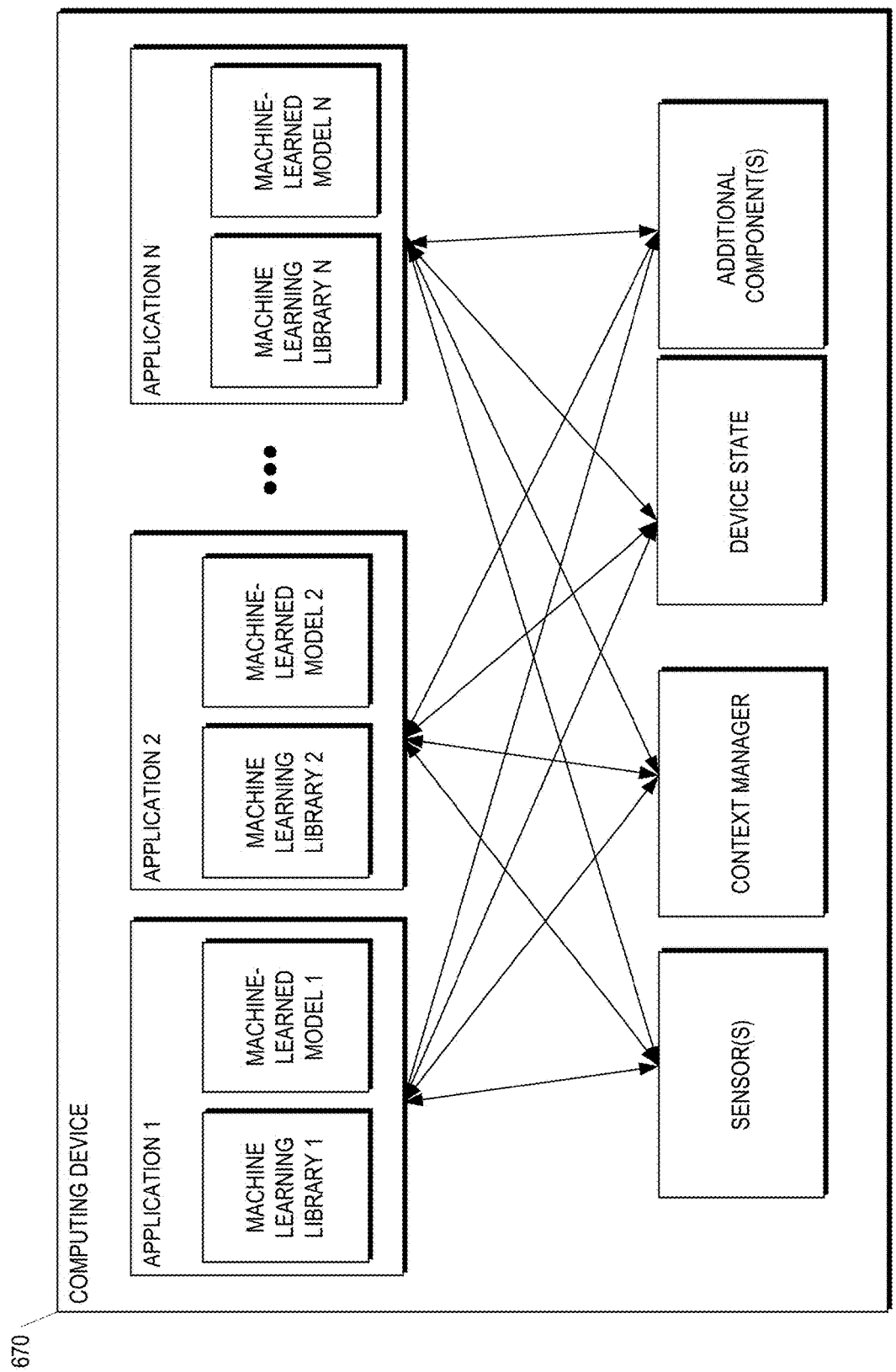
FIG. 6B depicts a block diagram of an example computing device that performs security control selection for a proposed cloud architecture according to some implementations of the present disclosure.

FIG. 6B depicts a block diagram of an example computing device 670 that performs security control selection for a proposed cloud architecture according to some implementations of the present disclosure. The computing device 670 can be a user computing device or a server computing device.

The computing device 670 includes a number of applications (e.g., applications 6 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 6B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 6C:
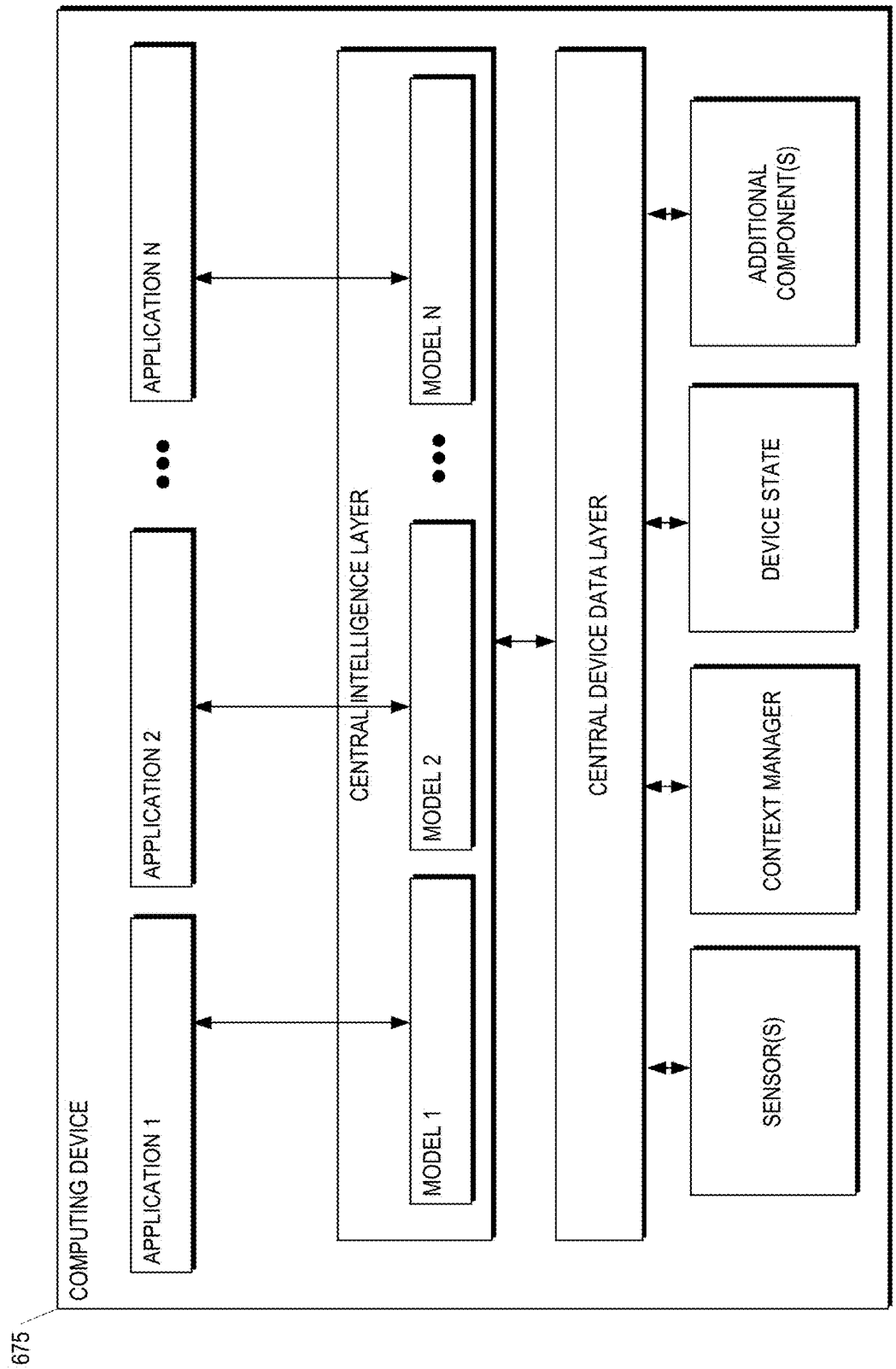
FIG. 6C depicts a block diagram of an example computing device that performs training and/or prompting of agentic orchestration models according to some implementations of the present disclosure.

FIG. 6C depicts a block diagram of an example computing device 675 that performs training and/or prompting of agentic orchestration models according to some implementations of the present disclosure. The computing device 675 can be a user computing device or a server computing device.

The computing device 675 includes a number of applications (e.g., applications 6 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 6C, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing device 675.

The central intelligence layer can communicate with a central device data layer. The central device data layer can be a centralized repository of data for the computing device 675. As illustrated in FIG. 6C, the central device data layer can communicate with a number of other components of the computing device, such as, for example, one or more sensors, a context manager, a device state component, and/or additional components. In some implementations, the central device data layer can communicate with each device component using an API (e.g., a private API).

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method comprising:
obtaining, by a computing system comprising one or more computing devices, cloud architecture information descriptive of a proposed cloud architecture, comprising:
user response information comprising information indicative of cloud architecture requirements for the proposed cloud architecture to fulfill; and
component selection information indicative of a plurality of cloud components that meet cloud architecture requirements for the proposed cloud architecture;
processing, by the computing system, the cloud architecture information with a plurality of agentic orchestration models to obtain a role output comprising security control information indicative of a plurality of security controls selected for the proposed cloud architecture, wherein each of the plurality of agentic orchestration models comprises a machine-learned model prompted to fulfill a corresponding cloud architecting role of a plurality of cloud architecting roles, and wherein the role output is associated with a cloud security role of the plurality of cloud architecting roles; and
based on the security control information, providing, by the computing system, information indicative of the plurality of security controls selected for the proposed cloud architecture to a user device associated with the user response information.

2. The computer-implemented method of claim 1, wherein providing the information indicative of the plurality of security controls to the user device associated with the user response information comprises:
providing, by the computing system, a visual representation of the proposed cloud architecture to the user device associated with the user response information, wherein the visual representation depicts the plurality of security controls selected for the proposed cloud architecture.

3. The computer-implemented method of claim 1, wherein providing the information indicative of the plurality of security controls comprises:
generating, by the computing system, control configuration information for the plurality of security controls; and
providing, by the computing system, the control configuration information to the user device associated with the user response information.

4. The computer-implemented method of claim 3 wherein obtaining the cloud architecture information further comprises:
obtaining, by the computing system, task selection information indicative of one or more tasks selected from a plurality of candidate tasks, and wherein the one or more tasks comprises at least one of:
a machine-readable configuration file generation task associated with generating the control configuration information;
a visual representation task associated with generating a visual representation of the plurality of security controls;
a component validation task associated with validating the plurality of cloud components in accordance with a particular component validation framework;

a control deployment task associated with deployment of the plurality of security controls; or a framework validation task associated with validating the plurality of security controls in accordance with a particular control validation framework.

5. The computer-implemented method of claim 4, wherein obtaining the task selection information comprises:
obtaining, by the computing system, the task selection information indicative of the one or more tasks selected from the plurality of candidate tasks, wherein the one or more tasks comprises the framework validation task, and wherein generating the control configuration information indicative of the plurality of security controls comprises:
processing, by the computing system, the security control information with a particular agentic orchestration model of the plurality of agentic orchestration models to obtain control validation information indicative of a validation status for each of the plurality of security controls in accordance with the particular control validation framework, wherein the particular agentic orchestration model is prompted to fulfill a control validation cloud architecting role.

6. The computer-implemented method of claim 4, wherein obtaining the task selection information comprises:
obtaining, by the computing system, the task selection information indicative of the one or more tasks selected from the plurality of candidate tasks, wherein the one or more tasks comprises the visual representation task, and wherein generating the control configuration information indicative of the plurality of security controls further comprises:
processing, by the computing system, the cloud architecture information with a particular agentic orchestration model of the plurality of agentic orchestration models to obtain a visual representation of the proposed cloud architecture, wherein the particular agentic orchestration model is prompted to fulfill a visual design cloud architecting role, and wherein the visual representation of the proposed cloud architecture depicts associations between the plurality of security controls and the plurality of cloud components that meet the cloud architecture requirements for the proposed cloud architecture.

7. The computer-implemented method of claim 6, wherein the method further comprises:
providing, by the computing system, the visual representation to a user computing device associated with the user response information.

8. The computer-implemented method of claim 4, wherein obtaining the task selection information comprises:
obtaining, by the computing system, the task selection information indicative of the one or more tasks selected from the plurality of candidate tasks, wherein the one or more tasks comprises the machine-readable configuration file generation task, and wherein generating the control configuration information indicative of the plurality of security controls further comprises:
processing, by the computing system, the security control information with a particular agentic orchestration model of the plurality of agentic orchestration models to obtain the control configuration information, wherein the particular agentic orchestration model is prompted to fulfill a development cloud architecting role, and wherein the control configuration information comprises a machine-readable configuration file that, when processed, is indicative of the plurality of security controls.

9. The computer-implemented method of claim 4, wherein obtaining the task selection information comprises:
obtaining, by the computing system, the task selection information indicative of the one or more tasks selected from the plurality of candidate tasks, wherein the one or more tasks comprises a component validation task, and wherein generating the control configuration information indicative of the plurality of security controls comprises:
processing, by the computing system, the security control information with a particular agentic orchestration model of the plurality of agentic orchestration models to obtain component validation information indicative of a validation status for each of the plurality of cloud components in accordance with the particular component validation framework, wherein the particular agentic orchestration model is prompted to fulfill a component validation cloud architecting role.

10. The computer-implemented method of claim 4, wherein obtaining the task selection information comprises:
obtaining, by the computing system, the task selection information indicative of the one or more tasks selected from the plurality of candidate tasks, wherein the one or more tasks comprises the control deployment task, and wherein generating the control configuration information indicative of the plurality of security controls further comprises:
processing, by the computing system, the security control information with a particular agentic orchestration model of the plurality of agentic orchestration models to obtain a control deployment configuration file, wherein the particular agentic orchestration model is prompted to fulfill a developer operations cloud architecting role, and wherein the control deployment configuration file, when processed, causes deployment of the plurality of security controls.

11. The computer-implemented method of claim 10, wherein the method further comprises:
using, by the computing system, the control deployment configuration file to deploy the plurality of security controls.

12. The computer-implemented method of claim 1, wherein, prior to obtaining at least some of the cloud architecture information, the method comprises:
processing, by the computing system, the user response information with a first set of preceding agentic orchestration models to obtain a first preceding role output comprising generic component placeholder information indicative of a plurality of proposed generic component placeholders for components necessary to meet the cloud architecture requirements.

13. The computer-implemented method of claim 12, wherein processing the user response information with the first set of preceding agentic orchestration models further comprises:
processing, by the computing system, the first preceding role output with a second set of preceding agentic orchestration models to obtain a second preceding role output comprising the component selection information, wherein the component selection information respectively selects the plurality of cloud components for the plurality of proposed generic component placeholders.

14. A computing system, comprising:
one or more processor devices;
one or more tangible, non-transitory computer readable media storing computer-readable instructions that when executed by the one or more processor devices cause the computing system to perform operations, the operations comprising:
  obtaining cloud architecture information descriptive of a proposed cloud architecture, comprising:
    user response information comprising information indicative of cloud architecture requirements for the proposed cloud architecture to fulfill; and
    component selection information indicative of a plurality of cloud components that meet cloud architecture requirements for the proposed cloud architecture;
  processing the cloud architecture information with a plurality of agentic orchestration models to obtain a role output comprising security control information indicative of a plurality of security controls selected for the proposed cloud architecture, wherein each of the plurality of agentic orchestration models comprises a machine-learned model prompted to fulfill a corresponding cloud architecting role of a plurality of cloud architecting roles, and wherein the role output is associated with a cloud security role of the plurality of cloud architecting roles; and
  based on the security control information, generating control configuration information indicative of the plurality of security controls.

15. The computing system of claim 14, wherein obtaining the cloud architecture information further comprises:
  obtaining task selection information indicative of one or more tasks selected from a plurality of candidate tasks, and wherein the one or more tasks comprises at least one of:
    a machine-readable configuration file generation task associated with generating the control configuration information;
    a visual representation task associated with generating a visual representation of the plurality of security controls;
    a component validation task associated with validating the plurality of cloud components in accordance with a particular component validation framework;
    a control deployment task associated with deployment of the plurality of security controls; or
    a framework validation task associated with validating the plurality of security controls in accordance with a particular control validation framework.

16. The computing system of claim 15, wherein obtaining the task selection information comprises:
  obtaining the task selection information indicative of the one or more tasks selected from the plurality of candidate tasks, wherein the one or more tasks comprises the framework validation task, and wherein generating the control configuration information indicative of the plurality of security controls comprises:
  processing the security control information with a particular agentic orchestration model of the plurality of agentic orchestration models to obtain control validation information indicative of a validation status for each of the plurality of security controls in accordance with the particular control validation framework, wherein the particular agentic orchestration model is prompted to fulfill a control validation cloud architecting role.

17. The computing system of claim 15, wherein obtaining the task selection information comprises:
  obtaining the task selection information indicative of the one or more tasks selected from the plurality of candidate tasks, wherein the one or more tasks comprises the visual representation task, and wherein generating the control configuration information indicative of the plurality of security controls further comprises:
    processing the cloud architecture information with a particular agentic orchestration model of the plurality of agentic orchestration models to obtain a visual representation of the proposed cloud architecture, wherein the particular agentic orchestration model is prompted to fulfill a visual design cloud architecting role, and wherein the visual representation of the proposed cloud architecture depicts associations between the plurality of security controls and the plurality of cloud components that meet the cloud architecture requirements for the proposed cloud architecture.

18. The computing system of claim 17, wherein the operations further comprise:
  providing the visual representation to a user computing device associated with the user response information.

19. The computing system of claim 15, wherein obtaining the task selection information comprises:
  obtaining the task selection information indicative of the one or more tasks selected from the plurality of candidate tasks, wherein the one or more tasks comprises the machine-readable configuration file generation task, and wherein generating the control configuration information indicative of the plurality of security controls further comprises:
    processing the security control information with a particular agentic orchestration model of the plurality of agentic orchestration models to obtain the control configuration information, wherein the particular agentic orchestration model is prompted to fulfill a development cloud architecting role, and wherein the control configuration information comprises a machine-readable configuration file that, when processed, is indicative of the plurality of security controls.

20. One or more tangible, non-transitory computer readable media storing computer-readable instructions that when executed by one or more processor devices cause the one or more processor devices to perform operations, the operations comprising:
  obtaining cloud architecture information descriptive of a proposed cloud architecture, comprising:
    user response information comprising information indicative of cloud architecture requirements for the proposed cloud architecture to fulfill; and
    component selection information indicative of a plurality of cloud components selected that meet cloud architecture requirements for the proposed cloud architecture;
  processing the cloud architecture information with a plurality of agentic orchestration models to obtain a role output comprising security control information indicative of a plurality of security controls selected for the proposed cloud architecture, wherein each of the plurality of agentic orchestration models comprises a machine-learned model prompted to fulfill a corresponding cloud architecting role of a plurality of cloud architecting roles, and wherein the role output is associated with a cloud security role of the plurality of cloud architecting roles; and based on the security control information, providing information indicative of the plurality of security controls selected for the proposed cloud architecture to a user device associated with the user response information.

* * * * *